US009349398B1

(12) United States Patent
Ee et al.

(10) Patent No.: US 9,349,398 B1
(45) Date of Patent: May 24, 2016

(54) MICROACTUATOR BONDING HAVING INCREASED ADHESIVE EXPOSURE FOR MORE THOROUGH ADHESIVE CURE (71) Applicant: Magnecomp Corporation, Murrieta, CA (US)

(72) Inventors: Kuen Chee Ee, Chino, CA (US); Peter Hahn, Wildomar, CA (US); Long Zhang, Murrieta, CA (US)

(73) Assignee: MAGNECOMP CORPORATION, Murrieta, CA (US)

( * ) Notice: Subject to any disclaimer, the term of this patent is extended or adjusted under 35 U.S.C. 154(b) by 0 days.

(21) Appl. No.: 14/953,281

(22) Filed: Nov. 27, 2015

Related U.S. Application Data (62) Division of application No. 14/472,820, filed on Aug. 29, 2014, now Pat. No. 9,224,410.

(60) Provisional application No. 61/873,809, filed on Sep. 4, 2013.

(51) Int. Cl.
G11B 5/48 (2006.01)
G11B 5/55 (2006.01)

(52) U.S. Cl.
CPC ............. *G11B 5/483* (2015.09); *G11B 5/5552* (2013.01); *G11B 5/4826* (2013.01); *G11B 5/4853* (2013.01); *G11B 5/4873* (2013.01)

(58) Field of Classification Search
CPC .... G11B 5/483; G11B 5/4873; G11B 5/4826; G11B 5/6058; G11B 5/486; G11B 5/5552; G11B 5/4853
USPC .......................... 360/246.7, 291.9, 292, 294.4
See application file for complete search history.

(56) References Cited

U.S. PATENT DOCUMENTS

| 4,443,729 | A  | * | 4/1984  | Rider ................. H01L 41/1132 310/330 |
| 5,883,651 | A  | * | 3/1999  | Thiel ................... B41J 2/14233 310/28 |
| 7,280,319 | B1 |   | 10/2007 | McNab |
| 7,751,153 | B1 |   | 7/2010  | Kulangara et al. |
| 8,248,734 | B2 |   | 8/2012  | Fuchino |
| 8,498,082 | B1 | * | 7/2013  | Padeski ............... G11B 5/4873 360/294.4 |
| 8,570,688 | B1 | * | 10/2013 | Hahn .................. G11B 5/4873 360/244.5 |
| 8,630,067 | B2 |   | 1/2014  | Ando et al. |
| 2004/0183403 | A1 |   | 9/2004  | Uchiyama et al. |
| 2010/0073824 | A1 |   | 3/2010  | Nojima |
| 2010/0073825 | A1 | * | 3/2010  | Okawara ............. G11B 5/4826 360/294.4 |
| 2010/0085663 | A1 | * | 4/2010  | Ando ................... G11B 5/4826 360/244.2 |
| 2010/0195252 | A1 | * | 8/2010  | Kashima ............. G11B 5/4833 360/294.4 |
| 2010/0264934 | A1 |   | 10/2010 | Inoue |
| 2011/0085269 | A1 | * | 4/2011  | Hanya ................. G11B 5/4833 360/244.2 |
| 2011/0096438 | A1 |   | 4/2011  | Takada et al. |
| 2011/0141624 | A1 | * | 6/2011  | Fuchino .............. G11B 5/4833 360/244.2 |
| 2011/0149440 | A1 | * | 6/2011  | Uematsu ............. G11B 5/4826 360/245.3 |
| 2013/0321958 | A1 |   | 12/2013 | Ikeji et al. |
| 2014/0022674 | A1 | * | 1/2014  | Takikawa ............ G11B 5/4813 360/244.5 |

* cited by examiner

Primary Examiner — Adam B Dravininkas
(74) Attorney, Agent, or Firm — Intellectual Property Law Offices of Joel Voelzke, APC (57) ABSTRACT In a dual stage actuated suspension, conductive adhesive is both sandwiched between a microactuator and a grounded stainless steel layer of the suspension, and also extends at least partially onto a wrap-around portion of the microactuator's ground electrode. The conductive adhesive that extends onto the wrap-around portion of the electrode has an exposed edge for more complete exposure and curing during the cure step.

10 Claims, 5 Drawing Sheets

FIG. 1
Bottom View

FIG. 2

FIG. 3
Top View

FIG. 4
Bottom View

FIG. 7
Top View

FIG. 8
Bottom View

MICROACTUATOR BONDING HAVING INCREASED ADHESIVE EXPOSURE FOR MORE THOROUGH ADHESIVE CURE

CROSS-REFERENCE TO RELATED APPLICATIONS

This application is a divisional of U.S. application Ser. No. 14/472,820 filed Aug. 29, 2014, which claims the benefit of U.S. provisional patent application No. 61/873,809 filed Sep. 4, 2013.

BACKGROUND OF THE INVENTION

1. Field of the Invention

This invention relates to the field of suspensions for disk drives. More particularly, this invention relates to the field of structures and methods for grounding a microactuator to a suspension in a dual stage actuated (DSA) suspension.

2. Description of Related Art

As the track densities of hard disk drives (HDDs) continue to increase, the need to position the data read/write head over the spinning disk platter quickly and accurately has likewise increased. Dual stage actuated (DSA) suspensions have been developed in order to accommodate the demand for more expedient and accurate positioning of the read/write head.

In a DSA suspension, as for example in U.S. Pat. No. 7,459,835 issued to Mei et al. as well as many others, in addition to a voice coil motor which moves the entire suspension, at least one additional microactuator is located on the suspension in order to effect fine positional movements of the magnetic head slider keeping it properly aligned over the correct data track on the spinning disk. The microactuator(s) provide much finer control and higher bandwidth of the servo control loop than would a voice coil motor alone, which effects relatively coarse movements of the suspension and hence the magnetic head slider. A piezoelectric element, sometimes referred to simply as a PZT, is often used as the microactuator motor, although other types of microactuator motors are possible. In the discussion that follows, for simplicity the microactuator will be referred to simply as a "PZT," although it will be understood that the microactuator need not be of the PZT type.

DSA suspensions in which the PZT is located at or near the suspension gimbal are called gimbal-based DSA suspensions, or simply GSA suspensions. Generally speaking, GSA suspensions provide higher servo bandwidth than do DSA suspensions in which the PZT is located at the base plate or on the body of the load beam.

Figure 1:
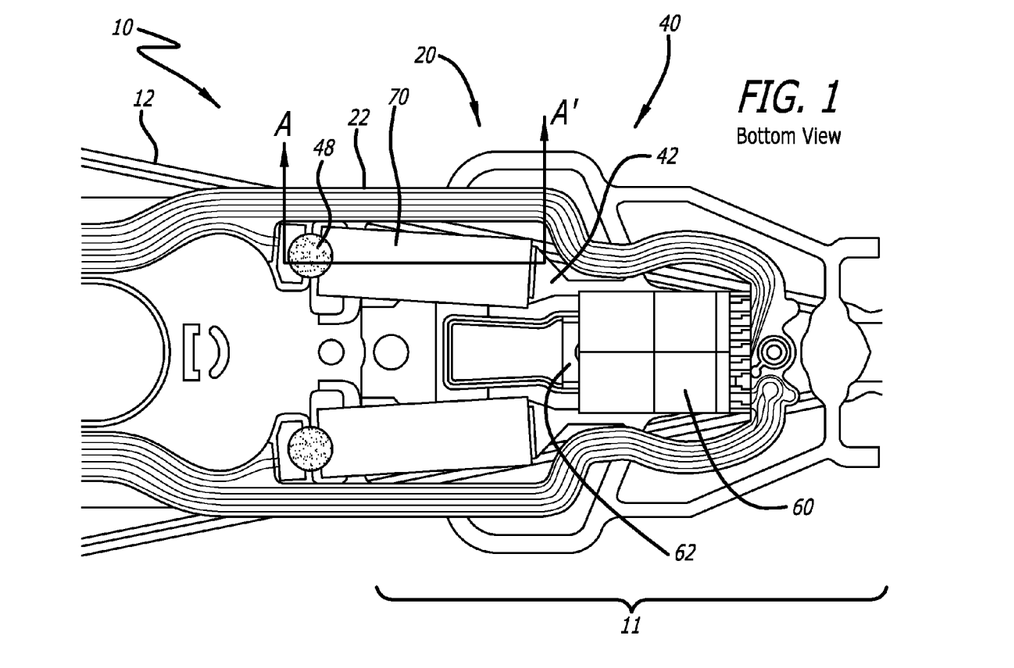
FIG. 1 is a bottom plan view of a prior GSA suspension.
Figure 2:
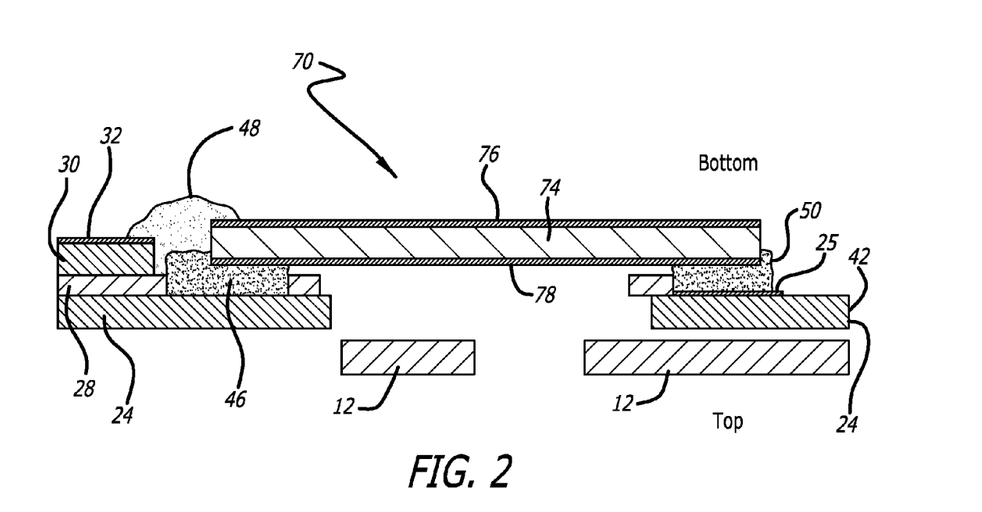
FIG. 2 is a sectional view of the GSA suspension of FIG. 1, taken along section line A-A'.

Without admitting that FIG. 1 is "prior art" within the legal meaning of that term, FIG. 1 is a bottom plan view of a prior GSA suspension 10 designed by the assignee of the present application, and FIG. 2 is a cross sectional view of the suspension of FIG. 1 taken along section line A-A', showing the details of the PZT mechanical and electrical bonding to the flexure. As used herein the term "bottom" refers to the side of a suspension or part thereof that faces the data storage disk, and "top" refers to the side of a suspension or part thereof that faces away from the data storage disk. The bottom side of a suspension is sometimes referred to as the slider side. The bottom side of the suspension and its components are therefore oriented toward the top of FIG. 2, and the top side of the suspension and its components are oriented toward the bottom of the figure.

Additionally, as used herein the term "proximal" means toward the actuator arm to which the suspension is mounted, and "distal" means toward the cantilevered end of the suspension to which the head slider is mounted.

In the figure, suspension 10 includes a load beam 12 and a flexure 20 affixed at the distal end 11 of load beam 12, typically by laser spot welding. Flexure 20 typically includes a metal support layer 24 which is typically stainless steel, an insulating layer 28 which is typically polyimide, and a signal conducting layer 30 of copper or copper alloy that includes various individual traces carrying information signals and voltages. Gold plating 32 over an exposed portion of the copper signal conducting layer 30 defines a gold contact pad 32 which carries the driving voltage for a PZT 70. A read/write head slider 60 is attached at a distal end 11 of suspension 10, on a gimbal tongue 62 which is part of a gimbal 40 on flexure 20. Gimbal 40 is formed from the stainless steel support layer 24, and includes PZT connector arms 42. Gimbal 40 allows head slider 60 to pitch, yaw, and roll freely as it travels over the disk platter to accommodate disk surface irregularities and vibrations.

PZT motor 70 includes a PZT element 74 together with top and bottom metallized surfaces on their respective top and bottom faces which form ground electrode 78 and driven electrode 76, respectively.

Driven electrode 76 on the bottom of PZT 70 is connected to gold plated contact pad 32 which provides the PZT driving signal or voltage, through conductive adhesive 48 which forms an electrically conductive bridge. Conductive adhesive 48 is typically a flowable hardenable conductive adhesive such as silver-containing conductive epoxy. Non-conductive adhesive 46, typically a non-conductive epoxy, provides the primary structural bonding and provides electrical insulation.

PZT top electrode 78 is electrically connected to the flexure's stainless steel layer 24 which is connected to ground, through conductive epoxy 50. Conductive epoxy 50 is sandwiched between PZT 70 and the gold plated pad 25 on stainless steel layer 24 of flexure 20.

Bottom electrode 76 of PZT 70 is thus the driven electrode which is connected to the driving voltage through a conductive epoxy bridge 48, and the top electrode 78 is the ground electrode that is connected to the grounded stainless steel body of flexure 20 through conductive epoxy 50 sandwiched between PZT 70 and stainless steel 24. Conductive epoxies 48 and 50 are typically cured by convection, and more typically by a heated air stream, although other types of adhesive such as UV-cured epoxy can be used.

When an actuation voltage is applied at gold contact pad 32, PZT 70 expands or contracts depending on whether the applied voltage is positive or negative. The proximal end of PZT 70 which is on the left side in the figure is relatively fixed, and the distal end which is on the right side of the figure is relatively freely moving. Actuation of PZT 70 thus causes the distal end of the PZT to move, which effects fine positional movements of head slider 60.

SUMMARY OF THE INVENTION

The inventors of the present invention have discovered that sometimes the electrical connection between the PZT and the stainless steel flexure is not as good as it should be, and that sometimes that electrical connection degrades or even fails completely over time under highly accelerated fatigue testing. The inventors have further identified a source of that problem as incomplete cure of the epoxy, due to the fact that conductive epoxy 50 that is sandwiched between PZT 70 and stainless steel layer 24 does not receive adequate heating during the curing process because PZT 70 and stainless steel layer 24 act as thermal insulators. Inadequate curing of conductive epoxy 50 can produce grounding degradation or even failure during epoxy fatigue reliability testing.

The inventors have invented a new structure and method for electrically bonding the PZT to the stainless steel that produces more complete curing of the conductive epoxy, and hence a higher quality and more robust electrical contact.

According to the invention, the conductive adhesive that forms the ground electrically conductive bridge to the grounded stainless steel layer of the flexure is relocated from between the PZT and the stainless steel to a location where it will receive sufficient heating (or other curing exposure) during the curing process in order to more completely and reliably cure that epoxy than with the prior design of FIGS. 1 and 2.

According to a first exemplary embodiment, the electrically conductive bridge for the ground connection defined by conductive epoxy extends from the PZT's ground electrode to the stainless steel surface of the flexure that is opposite from the side on which the PZT is mounted, rather than to the same side on which the PZT is mounted. Additionally, if necessary an aperture is formed in the load beam to which the flexure is affixed so that the conductive epoxy bridge can now be accessed and heated directly through that aperture.

This departure from the prior design is counterintuitive because the ground connection now has a longer run to make through the conductive epoxy. Upon first examination that design change would appear to create a higher resistance ground connection than before. However, because that conductive epoxy is now directly accessible by the heated air stream (or other curing exposure such as UV curing) during the epoxy cure step, that conductive epoxy can now be heated more completely during that step and thus the quality of that conductive epoxy bridge is improved, decreasing the possibility of a poor quality connection or even a complete failure of that bond over time and environmental conditions such as temperature cycling and vibration.

Because the epoxy that structurally bonds the distal end of the PZT to the flexure is no longer the primary electrical ground connection, that epoxy can be either conductive epoxy as in the prior design, or can be non-conductive epoxy.

In this first embodiment, the conductive epoxy that defines the ground bridge to the PZT is located at the distal end of the PZT, which is the end of the microactuator opposite the driving voltage connection to the PZT, as in the prior design.

In a slight variation that defines a second embodiment, the conductive epoxy that defines the ground bridge to the PZT is located at the proximal end of the microactuator. In this second embodiment, therefore, both the drive voltage and the ground connection are made at the proximal end of the PZT.

In a third illustrative embodiment, the PZT has a wraparound electrode that wraps around to either the distal end of the PZT or a small portion of the bottom of the PZT, and the conductive epoxy that defines the ground connection extends from the bottom of the PZT to at least some part of the wrap-around portion of the electrode. In this embodiment the conductive epoxy that defines the ground connection can be accessed for heating from the same side of the suspension as the driving voltage connection, namely, the bottom side. Thus, the two conductive epoxy bridges can be cured from the same side.

The invention is not limited to use in a GSA suspension, that is, a suspension in which the PZT is mounted to a flexure and which acts directly on the gimbal. Rather, then invention can be applied to a suspension which the PZT is mounted to a base plate or a load beam, which represent generally older yet still viable designs.

DETAILED DESCRIPTION OF THE INVENTION

Figure 3:
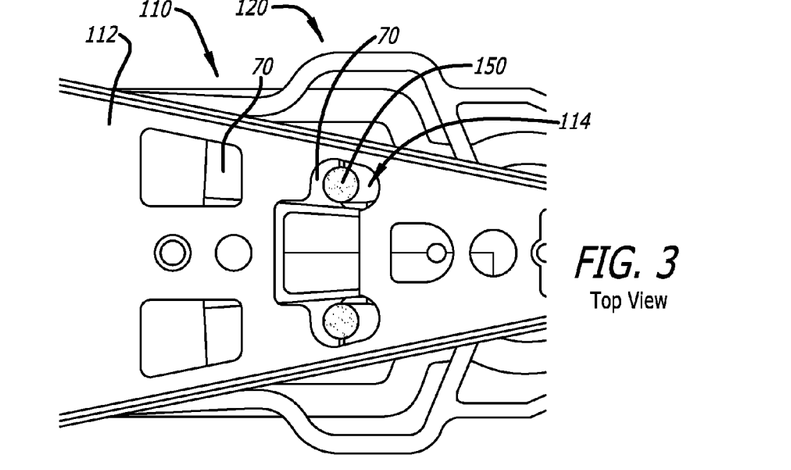
FIG. 3 is a top plan view of a GSA suspension of the invention according to a first embodiment.
Figure 4:
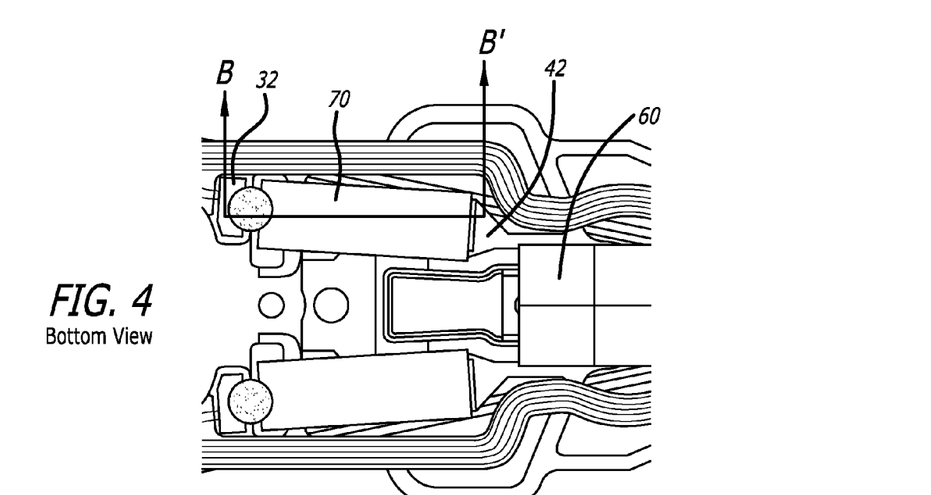
FIG. 4 is a bottom plan view of the GSA suspension of FIG. 3.

FIG. 3 is a top plan view of a GSA suspension 110 of the invention according to a first embodiment, and FIG. 4 is a bottom plan view thereof. Load beam 112 has been modified to provide an aperture 114 therein so that the new ground electrical connection 150 can be accessed for curing such as by directing a stream of hot air onto it for a thermally curing epoxy, or by shining UV light onto it for a UV-curing epoxy, or other exposure for other types of curing depending on the type of electrically conductive adhesive employed.

Figure 5:
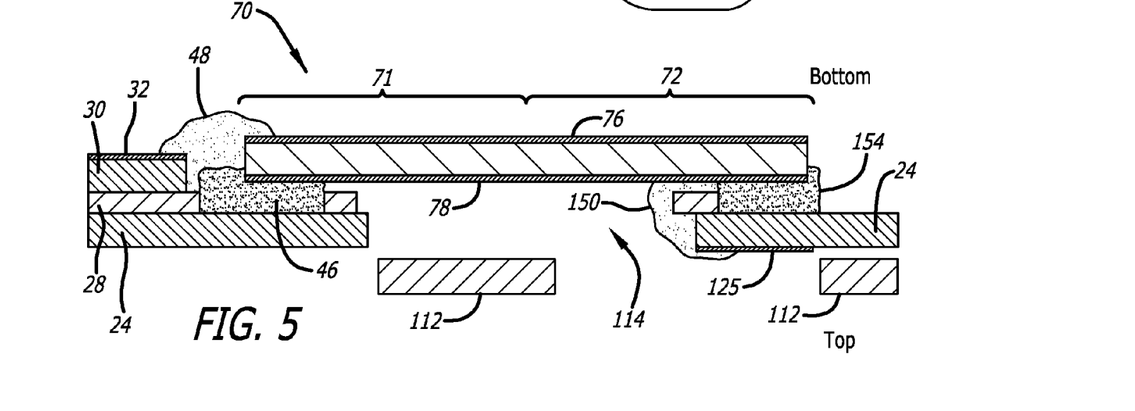
FIG. 5 is a sectional view of the GSA suspension of FIG. 4, taken along section line B-B'.

FIG. 5 is a sectional view of the GSA suspension of FIG. 4, taken along section line B-B'. In the figures, the PZT grounding has been modified. Specifically, the electrical bridge of conductive epoxy 150 that defines the grounding bridge at distal end 72 of PZT 70 is applied through the aperture or opening 114 in load beam 112 to create the electrical connection between the PZT top electrode 78 and a gold plating layer that defines a gold plated grounding pad 125 on the top surface of the stainless steel layer 24.

In the prior design of FIG. 2, the conductive epoxy 50 that participated in the ground connection extended from the top face 78 of PZT 70 to the bottom surface of stainless steel layer 24 which is the face or surface of stainless steel layer 24 that faces the PZT. In the present invention by contrast, conductive epoxy 150 that participates in the ground connection extends from the top face 78 of PZT 70 to the face or surface of stainless steel layer 24 that is opposite the side facing the PZT. In the present invention, therefore, the driving voltage gold contact pad 32 and the gold ground pad 125 to which the driven and ground electrodes of PZT 70 are respectively connected are located on opposite sides, surfaces or faces of flexure 120. As used herein, the term "face" or "surface" of an element such as a copper layer 30 or stainless steel layer 24, includes any thin surface treatment including without limitation any gold or nickel plating. Furthermore, in this embodiment the gold contact pad 125 that defines the ground contact pad lies on the surface of stainless steel layer 24 that faces away from copper conducting layer 30, whereas in the prior design the gold contact pad 25 that defined the ground contact pad was disposed on the surface of the stainless steel layer that faced toward copper conductive layer 30. Thus the driven and ground electrodes of the microactuator are electrically connected to a driving voltage and to ground, respectively, at opposite faces of the flexure.

In the present invention the ground path of FIG. 5 through the conductive epoxy bridge 150 is at least nominally longer than in the prior design of FIG. 2. The conductive epoxy portion of a PZT's ground path is usually the highest resistance portion of that ground path, and thus the designer generally tries to minimize the length of that conductive epoxy portion. With the structure of the present invention including its longer conductive epoxy portion of the ground path, however, the conductive epoxy 150 that defines part of the grounding path is not sandwiched, but is more completely exposed to air and the convection heating provided by the air through aperture 114, and is thus able to obtain adequate heat during the epoxy curing process. Conductive epoxy bridge 150 is directly accessible through aperture 114 in load beam 112 for hardening by a stream of hot air blowing onto that bridge. As a result, the reliability of the conductive epoxy portion of the ground path is improved.

It is not necessary that the structural epoxy 154 that is sandwiched between the PZT 70 and the stainless steel 24 be non-conductive epoxy; rather, it could be conductive epoxy as well. As long as there is at least some conductive epoxy that is sufficiently exposed to air so as to produce full curing of the epoxy, the improvement of the present invention will be realized.

As in the prior design, driven electrode 76 on the bottom of PZT 70 is connected to gold plated contact pad 32 which provides the PZT driving signal or voltage, through conductive adhesive 48 which forms an electrically conductive bridge at the proximal end 71 of PZT 70.

Figure 6:
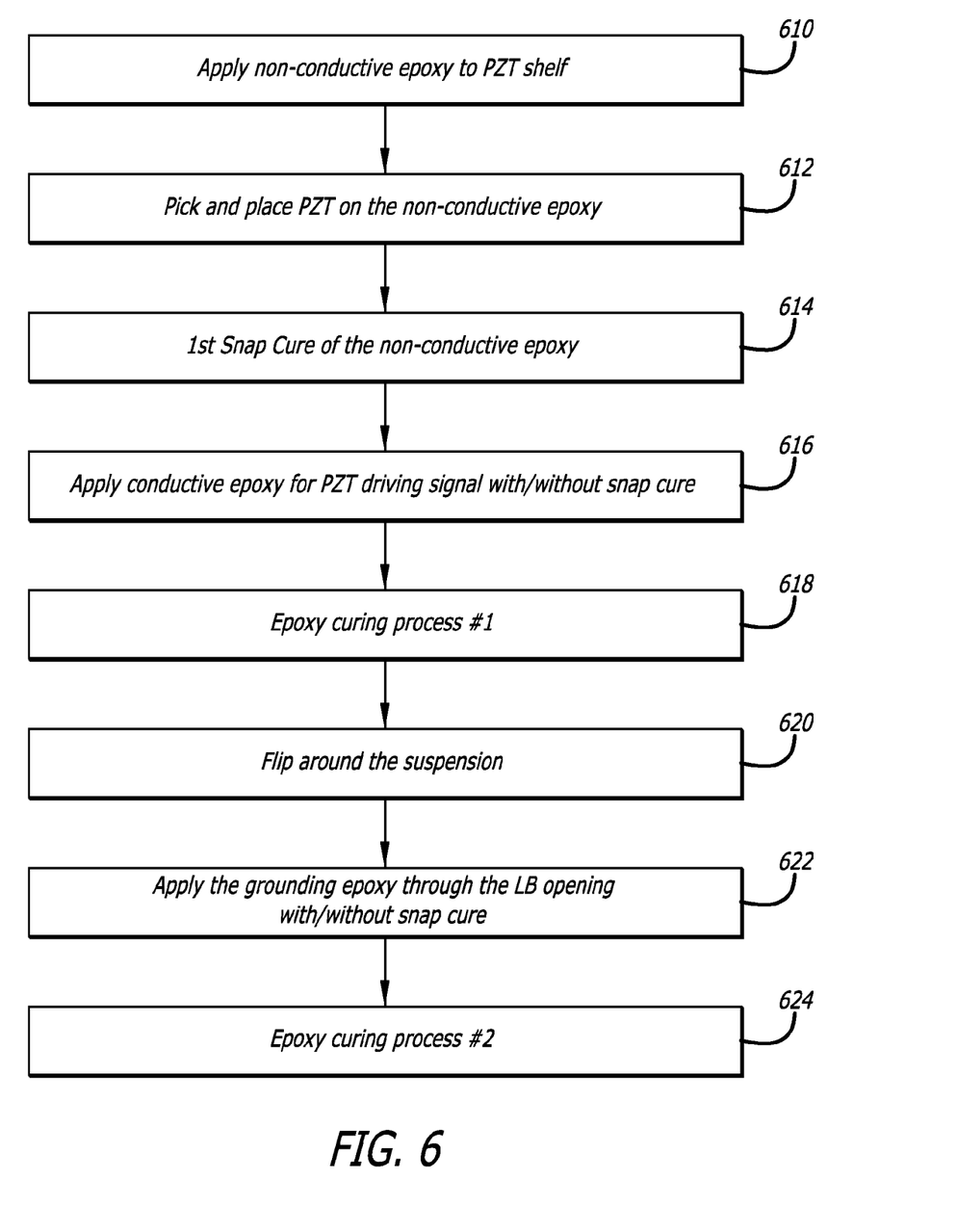
FIG. 6 is an assembly flow chart for the adhesive bonding and curing steps for the suspension of FIG. 3.

FIG. 6 is an assembly flow chart for the adhesive bonding and curing steps for the suspension of FIG. 3. Unlike the prior assembly process for GSA suspensions, according to the invention the PZTs are bonded first, and then the suspension is flipped over before applying the grounding epoxy. An extra curing process step is used in the illustrative embodiment in order to ground the PZT to the stainless steel. More specifically, the process according to the embodiment is as follows. At step 610 non-conductive epoxy 46 and 154 is applied to the shelf on the flexure, base plate, or load beam to which the PZT 70 is mounted. Alternatively, epoxy 154 could be conductive epoxy. At step 612 the PZT 70 is picked and placed onto the non-conductive epoxy 46 and 154. At step 614 the non-conductive epoxy is snap cured. At step 616 the conductive epoxy 48 for the PZT driving signal is applied, with our without a snap cure. At step 618 the first epoxy curing step is applied, usually by directing a stream of hot air onto the epoxy. At step 620 the suspension 110 is flipped over. At step 622 the grounding epoxy 150 is applied through the opening 114 in the load beam, with or without a snap cure. At step 624 the second epoxy curing step is applied, again usually by directing a stream of hot air onto the epoxy.

In the first embodiment, ground bridge 150 is located at the distal end 72 of PZT 70, away from the proximal end 71 at which the driving voltage conductive bridge 48 is located, as in the prior design. As will be seen in a second embodiment, the driving connection and the ground connection need not be located on opposite ends of PZT 70, but could be located at the same end of the PZT.

Figure 7:
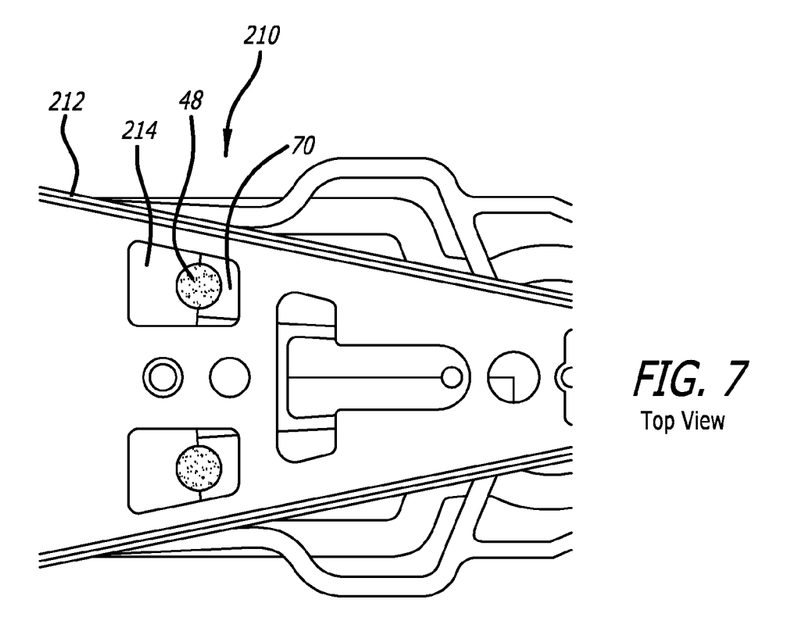
FIG. 7 is a top plan view of a GSA suspension of the invention according to a second embodiment.
Figure 8:
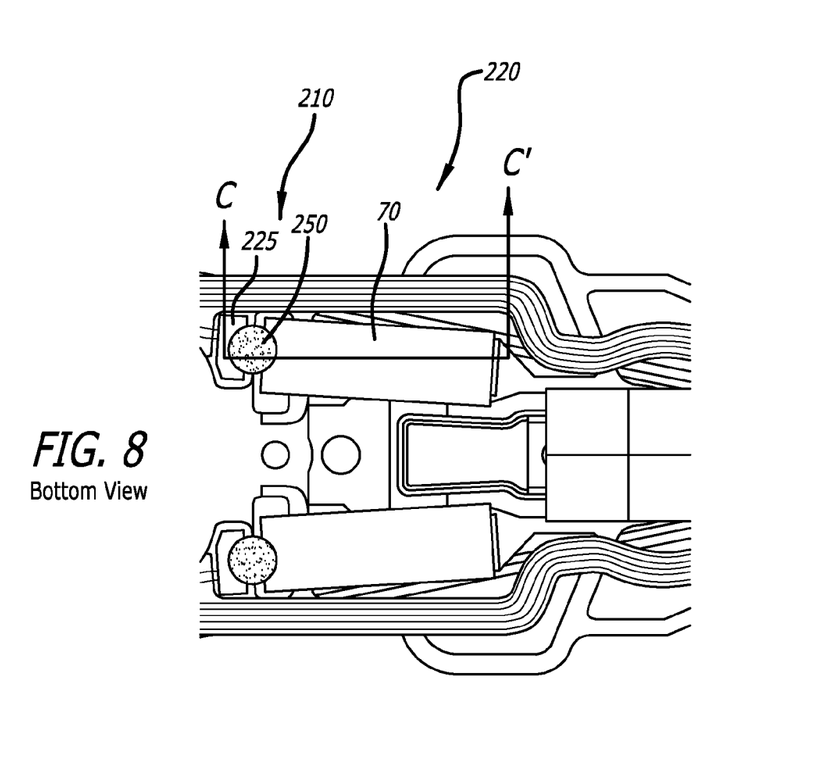
FIG. 8 is a bottom plan view of the GSA suspension of FIG. 7.
Figure 9:
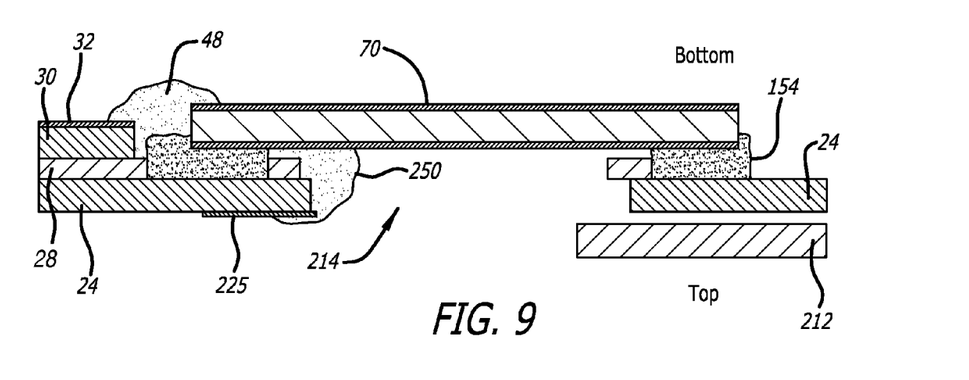
FIG. 9 is a sectional view of the GSA suspension of FIG. 8, taken along section line C-C'.

FIG. 7 is a top plan view of a GSA suspension 210 of the invention according to a second embodiment, and FIG. 8 is a bottom plan view thereof. FIG. 9 is a sectional view of the GSA suspension of FIG. 8, taken along section line C-C'. In this embodiment the grounding conductive epoxy 250 is applied at the proximal end of the PZT rather than at the distal end as in the first embodiment. Ground conductive epoxy bridge 250 extends to a gold bond pad 225 that has been plated onto the stainless steel layer 24 of flexure 220. As in the first embodiment, in this embodiment an aperture 214 is provided in the load beam 212, and the conductive epoxy 250 that forms a part of the ground path is completely exposed to the air through the aperture and hence is completely exposed to convection heating during the epoxy cure processes, allowing for quicker and more complete curing of the conductive epoxy than in the prior design. The conductive epoxy 250 in the ground path is thus completely cured, enhancing the reliability of the ground connection.

The assembly steps are the same for this embodiment as for the first embodiment. As with the first embodiment, the epoxy 154 that is sandwiched between the PZT 70 and the stainless steel 24 could be either conductive or non-conductive epoxy.

Figure 10:
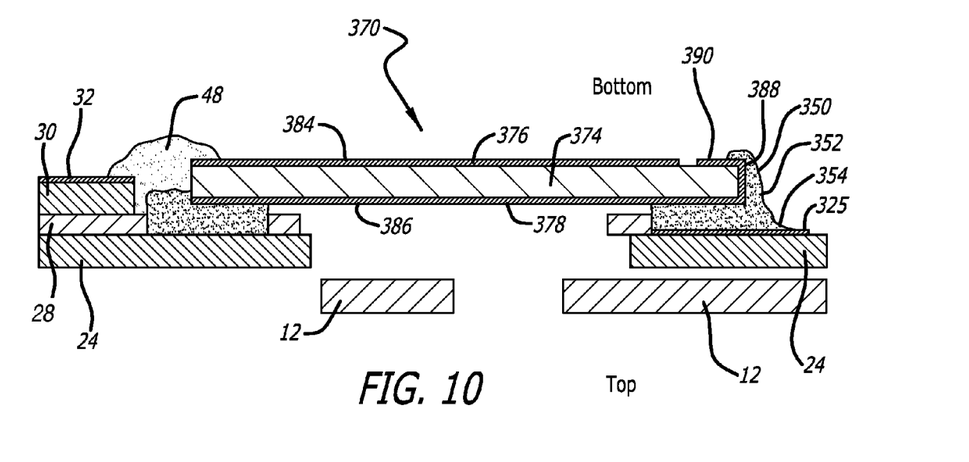
FIG. 10 is a sectional view of a third embodiment.

FIG. 10 is a sectional view of a third embodiment that employs a PZT 370 having a wrap-around electrode. PZT 370 has a PZT element 374, a bottom metalized surface 376 covering a majority 384 of its bottom surface and defining a first and driven electrode, and a second and ground electrode 378 that includes both a top surface 386 and either a side end 388 of PZT 370 and/or minority portion 390 of the PZT's bottom surface. As used herein, the term "wrap-around electrode" means an electrode that electrically extends from a first face to at least either the side end of the device, or to an opposite face of the device, or both. PZTs having such wrap-around electrodes are generally well known. Recent improvements in such devices and in methods of manufacturing such devices, and which could be employed in this embodiment, are disclosed in U.S. Pat. No. 8,773,820 issued to Hahn et al. and pending U.S. application Ser. No. 14/316,633 by Hahn et al., both assigned to the assignee of the present application, and both of which are incorporated herein by reference for their teachings of PZTs having wrap-around electrodes and methods of manufacturing the same.

In this embodiment conductive epoxy 350 extends from gold contact pad 325 on stainless steel layer 24, to the wrap-around portion of the electrode including side 388 and/or bottom minority portion 390. In this way the edge 352 of conductive epoxy 350 is fully exposed for curing. Edge 352 can also include a horizontally smeared-out portion 354 extending over gold bond pad 325 on stainless steel layer 24. The result is that at least the edge 352 of conductive epoxy 350 is fully exposed to the hot air stream during bonding, resulting in a high quality conductive epoxy bond and thus a high quality, reliable electrical bridge from gold ground pad 325 to at least the wrap-around portions 388 and/or 390 of PZT 370.

It will be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation. Similarly, unless the context dictates otherwise, the terms "distal" and "proximal" when used to refer to the ends of the PZT at which the electrical connections are made, should be understood to be terms used for convenience of discussion only rather than absolute terms.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, the invention is equally applicable to bonding a PZT microactuator to a base plate or a load beam of a suspension rather than a flexure. The invention is also applicable to making electrical connections to other types of electrical components rather than merely PZT microactuators or even microactuators generally. The invention is applicable to types of adhesive other than epoxy, and to other methods of curing adhesives such as UV-curing. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A dual stage actuated suspension for a disk drive, comprising:
    a head slider mounted to a distal end of the suspension;
    a metal layer;
    a microactuator for effecting fine movements of the head slider, the microactuator mounted to a first side of the metal layer, the microactuator having:
        a first face and an opposite second face, the second face being bonded to the metal layer;
        a driven electrode comprising at least a majority of the first face; and
        a ground electrode that is a wrap-around electrode, the wrap-around electrode having a main portion on the second face of the microactuator and further having a wrap-around portion, the wrap-around portion extending to a side of the microactuator and a minority portion of the first face; and
    a hardenable conductive adhesive bridge extending from the metal layer to the wrap-around portion of the microactuator's ground electrode and to the minority portion of the first face.

2. A dual stage actuated suspension for a disk drive, comprising:
    a head slider mounted to a distal end of the suspension;
    a metal layer;
    a microactuator for effecting fine movements of the head slider, the microactuator mounted to a first side of the metal layer, the microactuator having:
        a first face and an opposite second face, the second face being bonded to the metal layer;
        a driven electrode comprising at least a majority of the first face; and
        a ground electrode that is a wrap-around electrode, the wrap-around electrode having a main portion on the second face of the microactuator and further having a wrap-around portion, the wrap-around portion extending to at least one of a side of the microactuator and a minority portion of the first face; and
    a hardenable conductive adhesive defining a hardenable conductive adhesive bridge extending from the metal layer to the wrap-around portion of the microactuator's ground electrode, the hardenable conductive adhesive further extending from the metal layer to the ground electrode's main portion on the second face of the microactuator.

3. A dual stage actuated suspension for a disk drive, comprising:
    a head slider mounted to a distal end of the suspension;
    a metal layer having a gold plated pad thereon;
    a microactuator for effecting fine movements of the head slider, the microactuator mounted to a first side of the metal layer, the microactuator having:
        a first face and an opposite second face, the second face being bonded to the metal layer;
        a driven electrode comprising at least a majority of the first face; and
        a ground electrode that is a wrap-around electrode, the wrap-around electrode having a main portion on the second face of the microactuator and further having a wrap-around portion, the wrap-around portion extending to at least one of a side of the microactuator and a minority portion of the first face;
    wherein:
        a hardenable conductive adhesive bridge extends from the metal layer to the wrap-around portion of the microactuator's ground electrode,
        the gold plated pad is disposed between the hardenable conductive adhesive bridge and the metal layer, defining an electrical connection therebetween; and
        the hardenable conductive adhesive bridge has a smeared-out portion that extends over the gold plated pad on the metal layer, the smeared-out portion having an exposed top surface.

4. A dual stage actuated suspension for a disk drive, comprising:
    a head slider;
    a metal layer;
    a microactuator for effecting fine movements of the head slider, the microactuator mounted to a first side of the metal layer at a distal end of the suspension, the microactuator having:
        a first face and an opposite second face, the second face being bonded to the metal layer;
        a driven electrode comprising at least a majority of the first face; and
        a ground electrode that is a wrap-around electrode, the wrap-around electrode having a main portion on the second face of the microactuator and further having a wrap-around portion, the wrap-around portion extending to at least one of a side of the microactuator and a minority portion of the first face; and
    a hardenable conductive adhesive extending from the metal layer to each of:
        the ground electrode's main portion on the second face of the microactuator;
        said at least one side of the microactuator; and
        the minority portion of the first face.

5. The suspension of claim 4 wherein the hardenable conductive adhesive has an exposed edge where the hardenable conductive adhesive extends onto said at least one side of the microactuator.

6. The suspension of claim 4 wherein the hardenable conductive adhesive has a smeared-out portion that extends over the metal layer and has an exposed top surface.

7. The suspension of claim 4 wherein the metal layer has a gold pad thereon, the gold plated being disposed between the hardenable conductive adhesive and the metal layer, and defining an electrical connection therebetween.

8. A dual stage actuated suspension for a disk drive, comprising:
   a head slider;
   a grounded stainless steel layer;
   a gold ground pad covering a portion of the grounded stainless steel layer;
   a microactuator for effecting fine movements of the head slider, the microactuator mounted at a distal end of the suspension, the microactuator having a driven electrode and a ground electrode, the ground electrode comprising a bottom portion on an underside of the microactuator and a side portion extending over an entire side of the microactuator; and conductive epoxy that is:
   sandwiched between the bottom portion of the ground electrode and the gold ground pad to define a ground connection to the microactuator; and also
   extending over the entire side portion of the ground electrode of the microactuator.

9. The suspension of claim 8 wherein the conductive epoxy extends over the side portion of the ground electrode has an exposed edge.

10. The suspension of claim 8 wherein:
   the gold ground pad extends underneath the microactuator and beyond said side of the microactuator; and
   the conductive epoxy extends both underneath the microactuator and beyond said side of the microactuator, and is affixed to the gold ground pad beyond said side of the microactuator.

* * * * *

UNITED STATES PATENT AND TRADEMARK OFFICE
CERTIFICATE OF CORRECTION

| | | |
|---|---|---|
| PATENT NO. | : 9,349,398 B1 | Page 1 of 1 |
| APPLICATION NO. | : 14/953281 | |
| DATED | : May 24, 2016 | |
| INVENTOR(S) | : Kuen Chee Ee et al. | |

It is certified that error appears in the above-identified patent and that said Letters Patent is hereby corrected as shown below:

In the Claims

In claim 7, column 9, line 5, delete "plated" and insert -- pad --.

In claim 9, column 10, line 8, after "epoxy" insert -- that --.

Signed and Sealed this
Nineteenth Day of July, 2016

Michelle K. Lee
*Director of the United States Patent and Trademark Office*